(12) United States Patent
Lee et al.

(10) Patent No.: US 12,202,353 B2
(45) Date of Patent: Jan. 21, 2025

(54) BACKLASH VIBRATION REDUCTION APPARATUS AND METHOD

(71) Applicants: Hyundai Motor Company, Seoul (KR); Kia Corporation, Seoul (KR)

(72) Inventors: Won Bin Lee, Gyeonggi-do (KR); Seul Gi Lee, Gyeonggi-do (KR); Soo Bang Lee, Gyeonggi-do (KR); Sang Kook Woo, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 271 days.

(21) Appl. No.: 17/967,643

(22) Filed: Oct. 17, 2022

(65) Prior Publication Data
US 2023/0226924 A1    Jul. 20, 2023

(30) Foreign Application Priority Data

Jan. 18, 2022   (KR) .......................... 10-2022-0007399

(51) Int. Cl.
*B60L 15/20*       (2006.01)
*H02P 29/00*       (2016.01)

(52) U.S. Cl.
CPC .......... *B60L 15/20* (2013.01); *H02P 29/0016* (2013.01); *B60L 2240/12* (2013.01); *B60L 2250/28* (2013.01)

(58) Field of Classification Search
CPC .. B60L 15/20; B60L 2240/12; B60L 2250/28; B60L 2240/423; B60L 2240/80; B60L 2270/145; H02P 29/0016; Y02T 10/72; Y02T 10/62; B60W 20/00; B60W 20/10; B60W 20/17; B60W 30/20;
(Continued)

(56) References Cited

U.S. PATENT DOCUMENTS 9,919,618 B2 * 3/2018 Terada ................ B60L 15/2009
2015/0360584 A1 * 12/2015 Jung ............... B60W 30/18063
701/22
(Continued)

FOREIGN PATENT DOCUMENTS

JP       H 11-18214 A        1/1999
JP       2020-103002 A       7/2020
(Continued)

*Primary Examiner* — Thomas Ingram
(74) *Attorney, Agent, or Firm* — Fox Rothschild LLP

(57) ABSTRACT

Disclosed are a backlash vibration reduction apparatus and method capable of sufficiently performing gear alignment even when torque is increased while a vehicle is driven within a low torque range, thereby minimizing rough vibration due to backlash. The backlash vibration reduction apparatus includes a correction determination unit configured to determine whether it is necessary to correct a torque gradient to be applied for an increase to target torque in the state in which the current torque of a vehicle is retained within a predetermined low torque range and a torque gradient correction unit configured to determine a corrected torque gradient in which a torque increase rate per hour is reduced and a torque increase time period is extended by multiplying a correction factor by a first torque gradient as a torque gradient that increases the current torque upon determining that it is necessary to correct the torque gradient.

18 Claims, 11 Drawing Sheets

(58) Field of Classification Search
CPC ............. B60W 40/105; B60W 2520/10; F16H 57/0006; B60Y 2200/91; B60Y 2200/92; B60Y 2306/09
See application file for complete search history.

(56) References Cited

U.S. PATENT DOCUMENTS

| | | | |
|---|---|---|---|
| 2016/0347202 A1* | 12/2016 | Sawada | B60L 15/20 |
| 2017/0050536 A1* | 2/2017 | Martin | B60K 17/356 |
| 2018/0186362 A1* | 7/2018 | Koga | B60W 10/06 |
| 2022/0205525 A1* | 6/2022 | Kuehn | B60L 15/20 |
| 2024/0092418 A1* | 3/2024 | Kataoka | B62D 5/0463 |

FOREIGN PATENT DOCUMENTS

| | | |
|---|---|---|
| JP | 2021-027643 A | 2/2021 |
| KR | 10-1090708 B1 | 12/2011 |
| KR | 10-2019-0138118 A | 12/2019 |
| KR | 10-2020-0142665 A | 12/2020 |
| KR | 10-2021-0007077 A | 1/2021 |

\* cited by examiner

BACKLASH VIBRATION REDUCTION APPARATUS AND METHOD

CROSS-REFERENCE TO RELATED APPLICATIONS

This application claims under 35 U.S.C. § 119(a) the benefit of and priority to Korean Patent Application No. 10-2022-0007399, filed on Jan. 18, 2022, the entire contents of which are hereby incorporated by reference herein.

BACKGROUND

Technical Field

The present disclosure relates to a motor control unit which may comprise a backlash vibration reduction apparatus and a motor control method capable of reducing vibration or impact due to a backlash.

Background

In general, gears having backlash characteristics, such as a transmission or a final drive, are provided between a motor and a driving wheel provided in a vehicle. As shown in FIG. 1, therefore, the gears are idle by backlash when a torque direction is changed, whereby teeth of the gears collide with each other, and therefore vibration and noise are generated.

When a torque gradient from the current torque to target torque is mapped without consideration of gear backlash, therefore, a driver feels a rough driving sensation due to vibration generated whenever the gears experience backlash.

In general, an electrified vehicle having an electric motor as a power source, such as an electric vehicle or a hybrid electric vehicle, is configured such that target torque is set based on the accelerator pedal amount of an accelerator position sensor (APS) or the brake pedal amount of a brake position sensor (BPS) manipulated by the driver.

Torque is output while a torque gradient from the current torque to target torque of the vehicle is applied depending on the performance of a powertrain provided in the vehicle. At this time, the torque gradient is set using a torque gradient map preset based on values of the target torque and the current torque.

When a torque rising gradient is set to be high in order to improve vehicle responsibility, vibration and noise due to backlash are generated. As shown in FIG. 2, therefore, a torque rising or falling gradient is set to be low in a region in which a torque direction is changed (i.e. a backlash region), whereby the torque is slowly increased and gear alignment is precedingly performed when the torque direction is changed, and therefore a rough driving sensation is prevented.

Conventionally, however, the torque gradient is provided to lower the torque gradient in periods before and after the torque direction is changed. Consequently, when the torque is retained low without change in torque direction, i.e. when the torque of the vehicle that is driven at a torque of about 0 Nm is increased, a period to which a low gradient is applied is shorter than when the torque direction is changed, whereby roughness due to backlash still occurs.

SUMMARY OF THE DISCLOSURE

Accordingly, the present disclosure is directed to a backlash vibration reduction apparatus and method that substantially obviate one or more problems due to limitations and disadvantages of the related art.

An object of the present disclosure is to provide a backlash vibration reduction apparatus and method capable of sufficiently performing gear alignment even when torque is increased while a vehicle is driven within a low torque range within which the torque remains low, thereby minimizing impact or vibration due to backlash.

Objects of the present disclosure devised to solve the problems are not limited to the aforementioned object, and other unmentioned objects will be clearly understood by those skilled in the art based on the following detailed description of the present disclosure.

To achieve these objects and other advantages and in accordance with the purpose of the disclosure, as embodied and broadly described herein, a motor control unit for use in a vehicle, such as a backlash vibration reduction apparatus may be provided. In various embodiments, the motor control unit includes a correction determination unit configured to determine whether correction of a torque gradient to be applied for an increase to target torque is necessary in the state in which the current torque of a vehicle is retained within a predetermined low torque range and a torque gradient correction unit configured to determine a corrected torque gradient in which a torque increase rate per hour is reduced and a torque increase time period is extended by multiplying a correction factor by a first torque gradient as a torque gradient that increases the current torque upon determining that correction of the torque gradient is necessary.

The correction determination unit may include a low torque determination unit configured to determine whether the current torque is within a low torque range of about 0 Nm, a vehicle speed comparison unit configured to determine whether the current vehicle speed of the vehicle is equal to or greater than a threshold vehicle speed, and a retention time determination unit configured to determine whether the time duration during which the current torque is retained within the low torque range is equal to or greater than a predetermined value.

The low torque determination unit may be further configured to determine that the current torque is retained within the low torque range when the current torque is a value within a range of about −5 Nm to 5 Nm.

The retention time determination unit may be further configured to determine that a condition, in which correction of the torque gradient is necessary and/or required, is satisfied when the time duration, during which the current torque is retained, is within the low torque range of 0.1 seconds to 0.5 seconds.

The torque gradient correction unit may multiply a correction factor of less than 1 by the first torque gradient to reduce the torque gradient, thereby creating a corrected torque gradient in which a torque increase rate per hour is reduced and a torque increase time period is extended. In some embodiments, the torque gradient correction unit may multiply a correction factor ranging from 0.5 to 0.9.

The backlash vibration reduction apparatus may further include a torque gradient restoration unit configured to change the torque gradient applied to torque increase from the corrected torque gradient to the first torque gradient when the current torque of the vehicle increased according to the corrected torque gradient is equal to or greater than a predetermined torque value.

When a brake manipulation signal is input during torque increase according to the corrected torque gradient, whereby braking torque is generated, the torque gradient restoration unit may be further configured to change the torque gradient applied to the torque increase from the corrected torque gradient to the first torque gradient.

In another aspect, a backlash vibration reduction method includes determining whether correction of a torque gradient, to be applied for an increase to target torque is necessary and/or required in the state in which the current torque of a vehicle is retained within a predetermined low torque range and determining a corrected torque gradient in which a torque increase rate per hour is reduced and a torque increase time period is extended by multiplying a correction factor by a first torque gradient as a torque gradient that increases the current torque upon determining that correction of the torque gradient is necessary.

The step of determining whether correction of the torque gradient is necessary may include determining whether the current torque is within the low torque range, determining whether the current vehicle speed of the vehicle is equal to or greater than a threshold vehicle speed, and determining whether the current torque is retained within the low torque range for a predetermined period of time or longer.

In the step of determining whether the current torque is within the low torque range, a determination may be made that the current torque is retained within the low torque range when the current torque is a value of −5 to 5 Nm.

In the step of determining whether the current torque is retained within the low torque range for the predetermined time duration or longer, a determination may be made that the condition in which correction of the torque gradient is necessary is satisfied when the time during which the current torque is retained within the low torque range is 0.1 to 0.5 seconds.

In the step of determining the corrected torque gradient as the torque gradient, a correction factor of less than 1 may be multiplied by the first torque gradient to reduce the torque gradient, thereby creating a corrected torque gradient in which a torque increase rate per hour is reduced and a torque increase time period is extended.

The backlash vibration reduction method may further include changing the torque gradient applied to torque increase from the corrected torque gradient to the first torque gradient when the current torque of the vehicle increased according to the corrected torque gradient deviates from a predetermined torque value.

In the step of changing the torque gradient to the first torque gradient, when a brake manipulation signal is input during torque increase according to the corrected torque gradient, whereby braking torque is generated, the torque gradient applied to the torque increase may be changed from the corrected torque gradient to the first torque gradient.

Various embodiments may include a non-transitory computer-readable recording medium having a software program stored thereon containing computer executable code that when executed is configured to perform a method for controlling a motor in a vehicle, such as a backlash vibration reduction method. The method may include determining whether correction of a torque gradient, to be applied for an increase to target torque is necessary and/or required in the state in which the current torque of a vehicle is retained within a predetermined low torque range and determining a corrected torque gradient in which a torque increase rate per hour is reduced and a torque increase time period is extended by multiplying a correction factor by a first torque gradient as a torque gradient that increases the current torque upon determining that correction of the torque gradient is necessary.

In various embodiments, a vehicle including a motor control unit may be provided.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION OF THE DISCLOSURE

Figure 1:
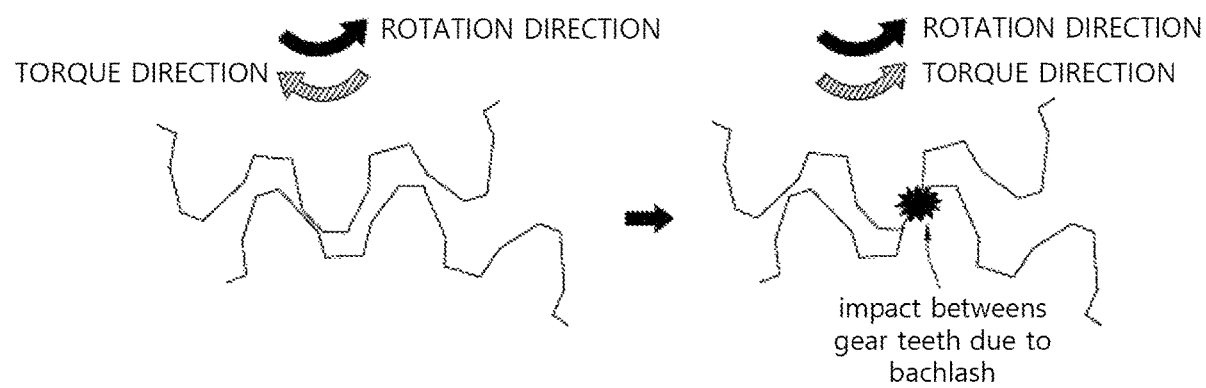
FIG. 1 is an illustrative view showing an example in which backlash vibration is generated.

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that, when a component is referred to as being "connected to" or "coupled to" another component, it may be directly connected to or coupled to the other component, or intervening components may be present. In contrast, when a component is referred to as being "directly connected to" or "directly coupled to" another component, there are no intervening components present.

A singular representation may include a plural representation unless it represents a definitely different meaning from the context.

It will be further understood that the terms "comprises", "has" and the like, when used in this specification, specify the presence of stated features, numbers, steps, operations, elements, components or combinations thereof, but do not preclude the presence or addition of one or more other features, numbers, steps, operations, elements, components, or combinations thereof.

In addition, "unit" or "control unit" included in names, such as a motor control unit and a hybrid control unit, is a term that is widely used to name a controller that controls a specific function of a vehicle, but does not mean a generic functional unit. For example, each control unit may include a communication device that communicates with another control unit or a sensor in order to control an assigned function, a memory that stores an operating system, logic commands, and input and output information, and at least one processor that performs determination, calculation, and decision necessary to control the assigned function.

Hereinafter, embodiments of the present disclosure will be described in detail with reference to FIGS. 1 to 11.

Figure 10:
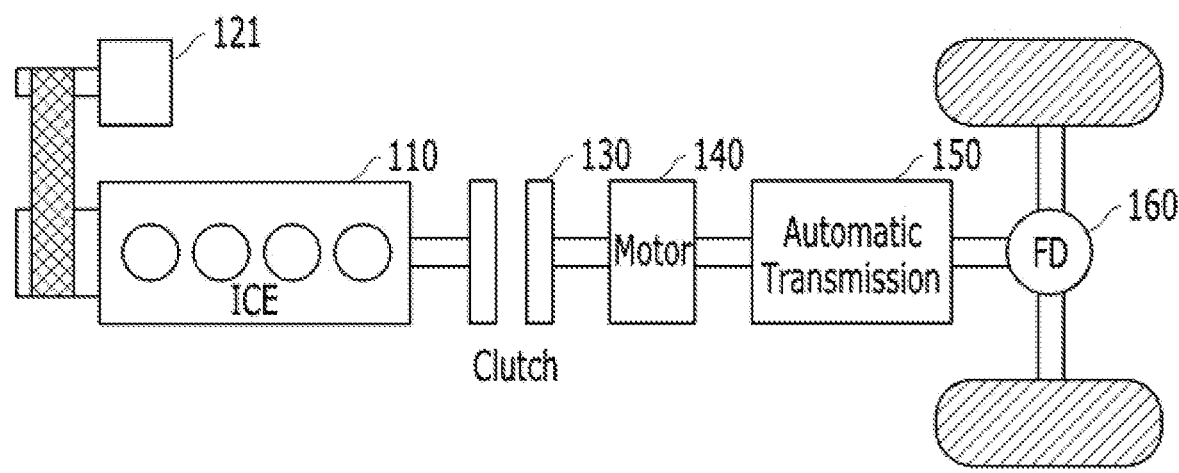
FIG. 10 represents an exemplary embodiment of a powertrain (i.e., drivetrain) of a hybrid electric vehicle (HEV.

At first, FIG. 10 represents a structure of an exemplary embodiment of a powertrain (i.e., drivetrain) of a HEV Though a HEV is taken as an example here, the present disclosure is not limited thereto. For example, the present disclosure may be applied to a battery electric vehicle.

In reference to FIG. 10, the powertrain is for a parallel HEV which has an electric motor (i.e., driving motor) 140 and an engine clutch 130 between an internal combustion engine (ICE) 110 and a transmission 150.

In this typed vehicle, as a driver starts the engine and treads on the accelerator pedal (i.e., accelerator pedal sensor on), first a battery power is used to drive the motor 140 with the engine clutch 130 open, and thus the wheels rotate by the power of the motor via the transmission 150 and a final drive (FD) 160 (i.e., EV mode). As the vehicle slowly moves and needs greater driving power, an auxiliary motor (or starter-generator motor 121) is activated to crank the engine 110.

Thereafter, when a difference of rotational speeds between the engine 110 and the motor 140 comes within a predetermined range, the engine clutch 130 is engaged, so that the engine 110 and the motor 140 drive the vehicle together (i.e., switch from EV mode to HEV mode). If an engine-off condition is satisfied, e.g., the vehicle decelerates, then the engine clutch 130 opens and the engine 110 stops (i.e., switch from HEV mode to EV mode). At this time, the battery (not shown) is charged by using the driving wheels via the motor 140 serving as a generator, which is called as regeneration of braking energy, or regenerative braking. Accordingly, since the starter-generator motor 121 serves as a starter motor when cranking the engine, and as a generator once the engine cranked or when regenerating rotational energy of the engine after it turned off, it may be called as a Hybrid Starter Generator (HSG).

Figure 11:
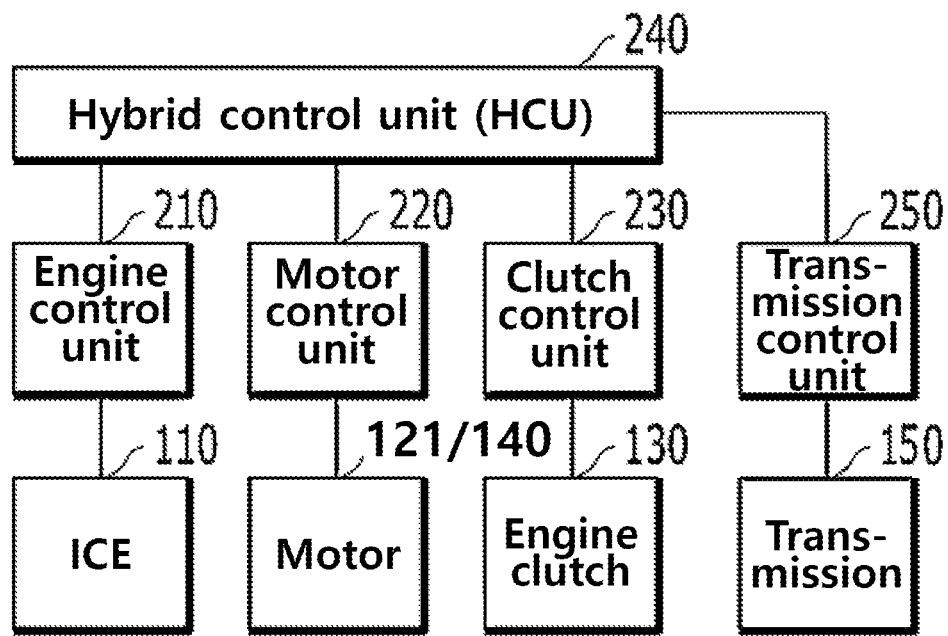
FIG. 11 represents an exemplary embodiment of a control scheme for a HEV.

FIG. 11 represents an exemplary embodiment of a control scheme for a HEV.

In reference to FIG. 11, in the HEV to which embodiments of the present disclosure can be applied, the internal combustion engine 110 may be controlled by an engine control unit 210, the first motor 121 and the second motor 140 by a motor control unit (MCU) 220 for their torques, and the engine clutch 130 by a clutch control unit 230. The engine control unit 210 may also be referred to as an engine management system (EMS). In addition, the transmission 150 is controlled by a transmission control unit 250.

Each control unit is connected to a hybrid control unit (HCU) 240 controlling the whole process of mode changes as an upper control unit, and, according to control of the HCU 240, provides to the HCU 240 information on driving-mode change, gear shift, control of the engine clutch 130, etc., and/or information necessary for engine-stop control, or performs actions according to control signals.

For example, the HCU 240 determines whether to perform a change in-between EV-HEV modes according to a driving state of the HEV. To this end, the HCU 240 determines when to open (i.e., disengage) the engine clutch 130, and performs a hydraulic pressure control for the opening. Also, the HCU 240 determines a state (lock-up, slip, open, etc.) of the engine clutch 130, and controls when to stop injecting fuel into the engine 110. Also, for the engine-stop control, the HCU may control regeneration of rotational energy of the engine by transmitting to the MCU 220 a torque command for controlling a torque of the first motor 121.

Surely, it is obvious to a person of ordinary skill in the art that the connections among the described control units and the function of each control unit and the way of distinguishing each control unit from the others are only examples and they are not limited by their names. For example, the HCU 240 may be integrated into one of the other control units so that the corresponding function can be provided by the integrated control unit, or the function may be distributed and integrated into two or more other control units.

The motor control unit 220 may include a backlash vibration reduction apparatus which will now be detailed with reference to FIGS. 1 to 9.

Figure 3:
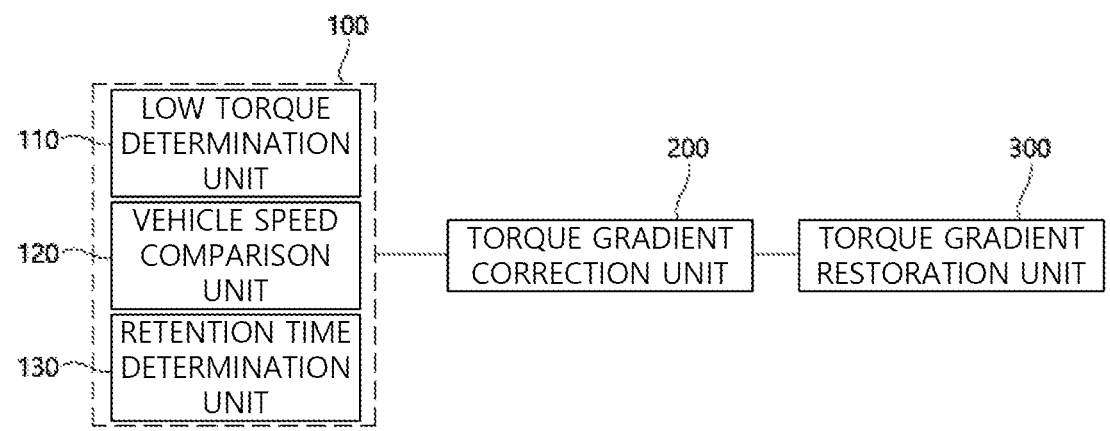
FIG. 3 is a block diagram of a backlash vibration reduction apparatus according to the present disclosure.
Figure 4:
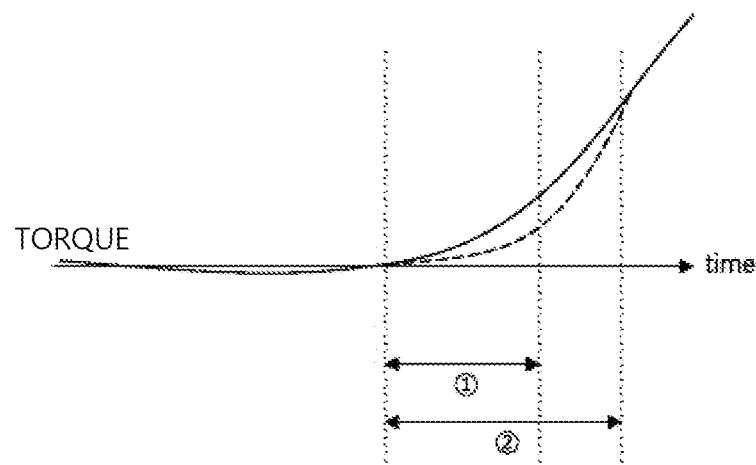
FIG. 4 is a graph showing an example in which a period in which gear alignment is performed is extended by reducing a torque gradient in accordance with the present disclosure.
Figure 5:
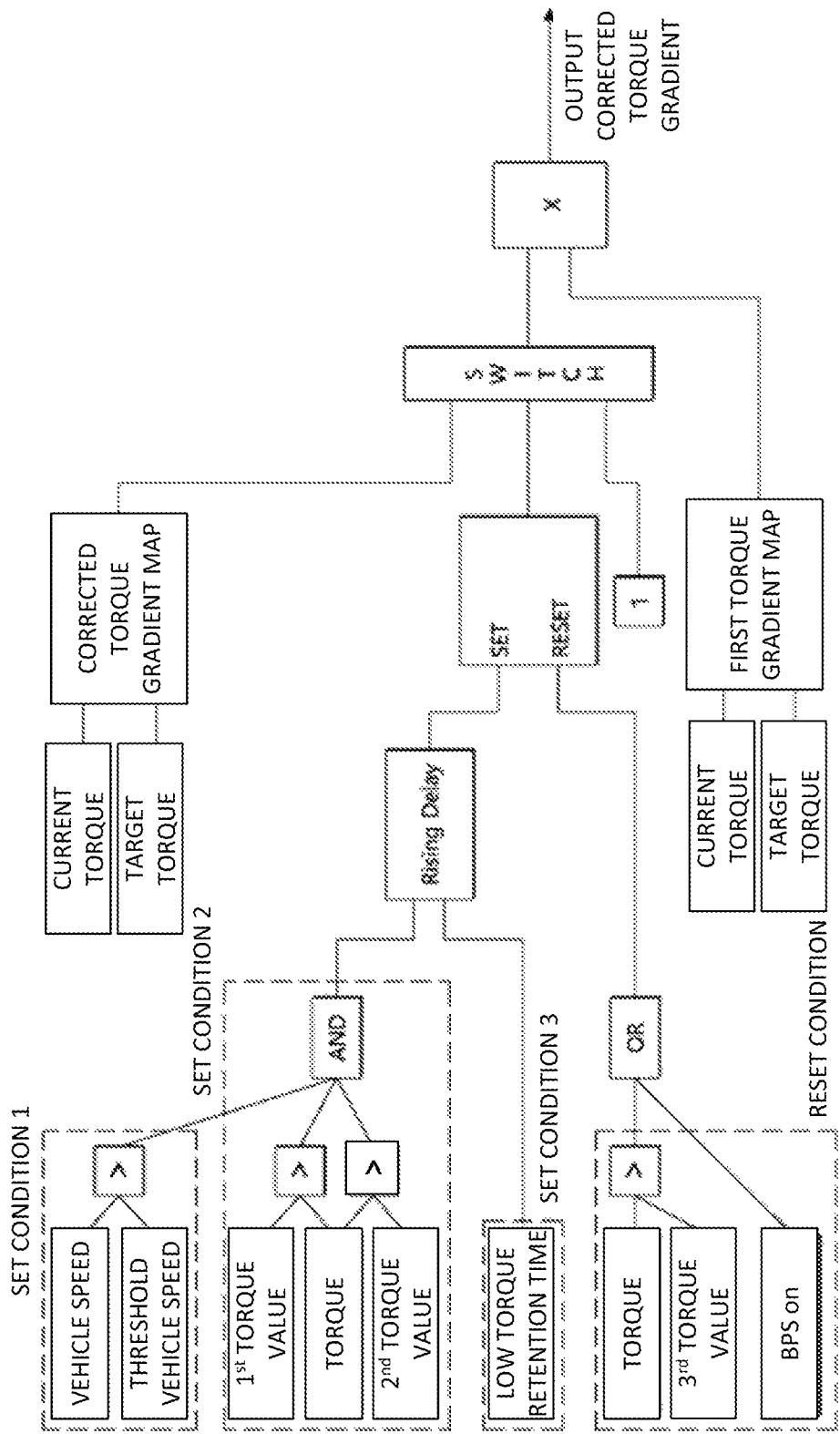
FIG. 5 is an illustrative view showing determination logic for selecting a torque gradient to be applied to an increase in torque of a vehicle in accordance with the present disclosure.

First, FIG. 3 is a block diagram of a backlash vibration reduction apparatus according to the present disclosure, FIG. 4 is a graph showing an example in which a period in which gear alignment is performed is extended by reducing a torque gradient in accordance with the present disclosure, and FIG. 5 is an illustrative view showing a determination logic for selecting a torque gradient to be applied to an increase in torque of a vehicle in accordance with the present disclosure.

Referring to FIG. 3, a backlash vibration reduction apparatus according to an embodiment of the present disclosure may include a correction determination unit 100 configured to determine whether it is necessary to correct a torque gradient to be applied for an increase to target torque in the state in which the current torque of a vehicle is retained within a predetermined low torque range and a torque gradient correction unit 200 configured to determine a corrected torque gradient in which a torque increase rate per hour is reduced and a torque increase time period is extended by multiplying a correction factor to a first torque gradient as a torque gradient that increases the current torque upon determining that it is necessary to correct the torque gradient.

In the present disclosure, in determining a torque gradient at which the current torque is increased such that the torque of a vehicle that is driven reaches target torque, a torque gradient applied when a torque direction is changed and a torque gradient applied when torque is retained at about 0 Nm without change in direction are distinguished from each other, whereby time in which a low torque increase rate is applied is sufficiently secured even when the torque direction is not changed such that gear alignment is performed.

In this specification, a profile indicating a torque gradient generally applied when a torque direction is changed for torque increase is referred to as a first torque gradient, and a torque gradient modified based on the first torque gradient when torque retained at about 0 Nm is increased without direction change is referred to as a corrected torque gradient.

In FIG. 4, the solid line indicates a first torque gradient, and the dotted line indicates a corrected torque gradient. In the first torque gradient, torque increase is performed at a middle point, and therefore a period in which a torque increase rate is small (period ①) is shorter than when a torque direction is changed such that gear alignment is possible. Even when torque increase is performed without change in torque direction, therefore, a period in which a torque increase rate per hour is small must be extended by period ② in order to sufficiently perform gear alignment.

The correction determination unit 100 may determine whether it is necessary to change a torque gradient to be applied in order to increase torque using the current torque and vehicle speed of the vehicle to the corrected torque gradient.

To this end, the correction determination unit 100 may include a low torque determination unit 110 configured to set a low torque range within which the torque of the vehicle that is driven is retained at about 0 Nm and to determine whether the current torque of the vehicle is within the low torque range, a vehicle speed comparison unit 120 configured to set a threshold vehicle speed that is not 0 kph in order to determine whether the vehicle is driven and to determine whether the current vehicle speed of the vehicle is equal to or greater than the threshold vehicle speed, and a retention time determination unit 130 configured to determine whether the time duration during which the current torque of the vehicle is retained within the low torque range is equal to or greater than a predetermined value in order to exclude the case in which the current torque of the vehicle temporarily falls within the low torque range during torque increase or decrease.

The low torque determination unit 110 may determine whether the current torque of the vehicle is within a low torque range set to a predetermined range of about 0 Nm. To this end, the low torque determination unit 110 may specify a first torque value and a second torque value having small values of about 0 Nm to set the low torque range.

At this time, the low torque range does not mean the state in which teeth of gears are brought into tight contact with each other in a forward direction or a reverse direction without a gap for driving or braking but means the state in which the teeth of the gears are movable in the forward direction or the reverse direction within the gap. As an example, therefore, the low torque range may be set to a value of −5 to 5 Nm. However, the present disclosure is not limited thereto, and the low torque range may be set to a smaller value or a larger value.

In addition, the vehicle speed comparison unit 120 may estimate the current vehicle speed of the vehicle using a wheel speed acquired from a wheel sensor of the vehicle and may determine whether the current vehicle speed is equal to or greater than a predetermined threshold vehicle speed.

When the vehicle is stopped, the current torque of the vehicle is 0 Nm or a value of about 0 Nm, which falls within the low torque range. When the corrected torque gradient is applied to increase the torque of the vehicle that starts to move in a stopped state, however, a vehicle start-up sensation may be delayed.

Consequently, the vehicle speed comparison unit 120 may determine that the corrected torque gradient is applicable only when the current vehicle speed of the vehicle is equal to or greater than a threshold vehicle speed at which it can be determined that the vehicle is not stopped.

In addition, the retention time determination unit 130 may determine that the condition in which the corrected torque gradient is applicable is satisfied only when the state in which the current torque of the vehicle is within the low torque range is retained for a predetermined time duration or longer. Consequently, it is possible to exclude the case in which the current torque of the vehicle temporarily falls within the low torque range during vehicle torque increase or decrease.

In the above embodiment, the low torque retention time during which the current torque of the vehicle is retained within the low torque range is set to 0.1 to 0.5 seconds. However, the present disclosure is not limited thereto, and the low torque retention time may be set to a smaller value or a larger value.

If the time is set to be too short, an incorrect determination may be made that correction is necessary even when torque is changed. If the time is set to be too long, time necessary to determine the retention time may be increased, whereby vehicle responsiveness may be reduced. Consequently, the low torque retention time may be variously selected within a range within which the current torque of the vehicle temporarily passes through the low torque state during torque increase is not included while much time is not necessary in measuring the retention time for determination.

In addition, the torque gradient correction unit 200 may select a corrected torque gradient in which a torque increase rate per hour is reduced by multiplying a correction factor by the first torque gradient as a torque gradient to be applied until the current torque of the vehicle reaches the target torque and may output the same to a motor control unit provided in the vehicle.

To this end, the torque gradient correction unit 200 may multiply a correction factor of less than 1 by the first torque gradient to create a corrected torque gradient in which a torque increase rate per hour is reduced and a torque increase time period is extended.

The correction factor is set to a value less than 1, since the corrected torque gradient is identical to the first torque gradient if the correction factor is 1. If the correction factor is less than 0.5, a torque increase time may be sufficiently secured within the low torque range, but a torque increase rate per hour becomes too small, whereby vehicle responsiveness may be reduced, and therefore a driver may feel oppressed. Consequently, the correction factor may be set to a value of 0.5 to 0.9.

The corrected torque gradient thus created may be stored in each torque map together with the first torque gradient, and therefore the torque gradient may be selected and output while being switched according to the result of determination of the correction determination unit.

In addition, the backlash vibration reduction apparatus according to the present disclosure may further include a torque gradient restoration unit 300 configured to change the torque gradient applied to torque increase from the corrected torque gradient to the first torque gradient when the current torque of the vehicle increased according to the corrected torque gradient is equal to or greater than a predetermined torque value.

The corrected torque gradient has a slower torque increase than the first torque gradient, since the torque increase rate per hour is reduced. When torque is increased by only applying the corrected torque gradient until the torque of the vehicle reaches the target torque, therefore, the driver may feel oppressed due to reduction in responsiveness. When the torque of the vehicle that is increased is equal to or greater than the torque value, therefore, a determination may be made that sufficient time for gear alignment has elapsed, and the torque gradient may be changed to the first torque gradient, thereby improving vehicle responsiveness.

In addition, even when a brake manipulation signal (BPS) is input during torque increase according to the corrected torque gradient, the torque gradient restoration unit 300 may change the torque gradient applied to torque change of the vehicle from the corrected torque gradient to the first torque gradient.

That is, when the brake manipulation signal (BPS) is input, a determination may be made that emergency deceleration of the vehicle is required, and the torque gradient is changed from the corrected torque gradient, in which the torque increase or decrease rate per hour is small, to the first torque gradient in order to implement a rapid response.

Next, an example of determination logic for selecting a torque gradient to be applied to an increase in torque of the vehicle will be described with reference to FIG. 5. In FIG. 5, selection of the corrected torque gradient as the torque gradient is indicated by SET, and selection of the first torque gradient before correction as the torque gradient is indicated by RESET.

To this end, a first torque gradient map and a corrected torque gradient map may be provided, and it may be determined whether the current situation is a situation in which gear alignment is not sufficiently performed when the first torque gradient is used, i.e. a situation in which the current torque is retained within a low torque range of about 0 Nm for a predetermined time duration, and the torque gradient may be output from any one of the first torque gradient map and the corrected torque gradient map based on the result of determination.

In order to select the torque gradient to be applied to increase torque, as described above, first, the vehicle speed comparison unit 120 determines whether the current vehicle speed of the vehicle is equal to or greater than a predetermined threshold vehicle speed. In FIG. 5, that the current vehicle speed of the vehicle is equal to or greater than a threshold vehicle speed is indicated by SET condition 1.

The low torque determination unit 110 determines whether the current torque of the vehicle has a value between a first torque value and a second torque value set as boundary values of a low torque range. In FIG. 5, that the current torque of the vehicle is within the low torque range is indicated by SET condition 2.

The retention time determination unit 130 determines whether the low torque retention time duration during which the current torque of the vehicle is retained within the low torque range is a predetermined value or longer. In FIG. 5, that the low torque state is retained during the low torque retention time is indicated by SET condition 3.

When SET condition 3 is satisfied while SET condition 1 and SET condition 2 are simultaneously satisfied, a determination is made that torque increase is delayed more than the first torque gradient (rising delay) and all conditions for reducing a torque increase rate per hour are satisfied, and SET, which is improved logic, is enabled.

When SET, which is improved logic, is enabled, as described above, the corrected torque gradient is output from a switch connected to the first torque gradient map and the corrected torque gradient map.

Subsequently, when the current torque of the vehicle that has torque increased by the corrected torque gradient is greater than a predetermined third torque value or when a brake manipulation signal (BPS) is input, whereby a RESET condition is satisfied, RESET, which restores the torque gradient to the state before application of improved logic, is enabled. When RESET is enabled, as described above, the switch is switched, and the corrected torque gradient is changed to the first torque gradient, and the first torque gradient is output.

Next, torque changes when first torque gradient is applied and when the corrected torque gradient is applied in order to increase torque within the low torque range within which the current torque is retained at about 0 Nm will be described with reference to FIGS. 6 to 8.

Figure 6:
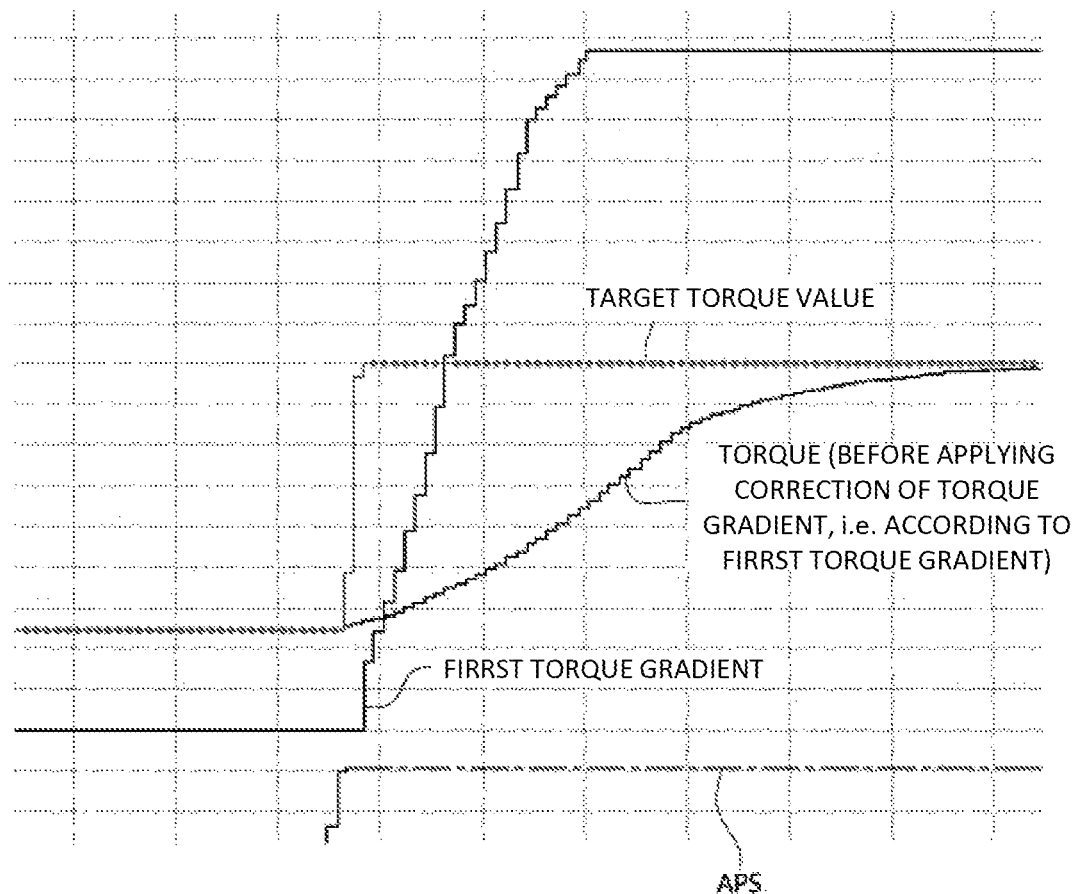
FIG. 6 is a graph showing an example in which a first torque gradient is applied to reach a target torque value.
Figure 7:
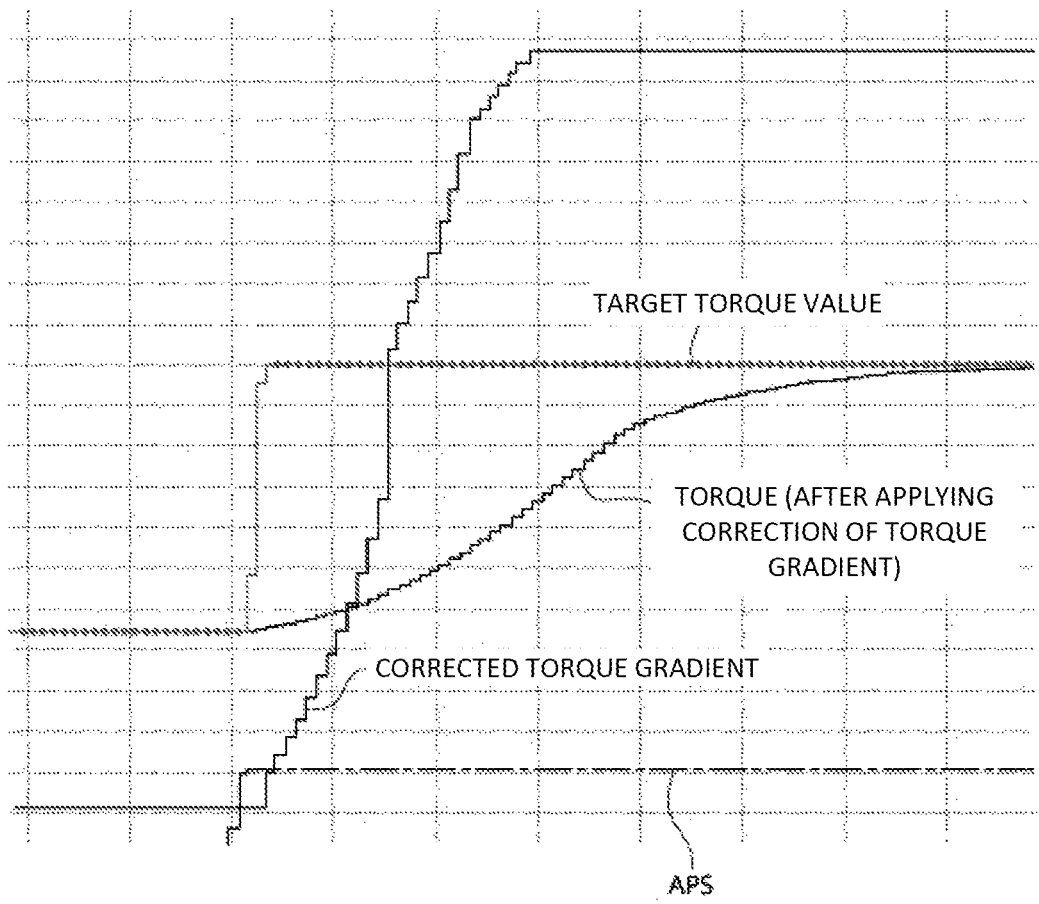
FIG. 7 is a graph showing an example in which an improved corrected torque gradient is applied to reach a target torque value.
Figure 8:
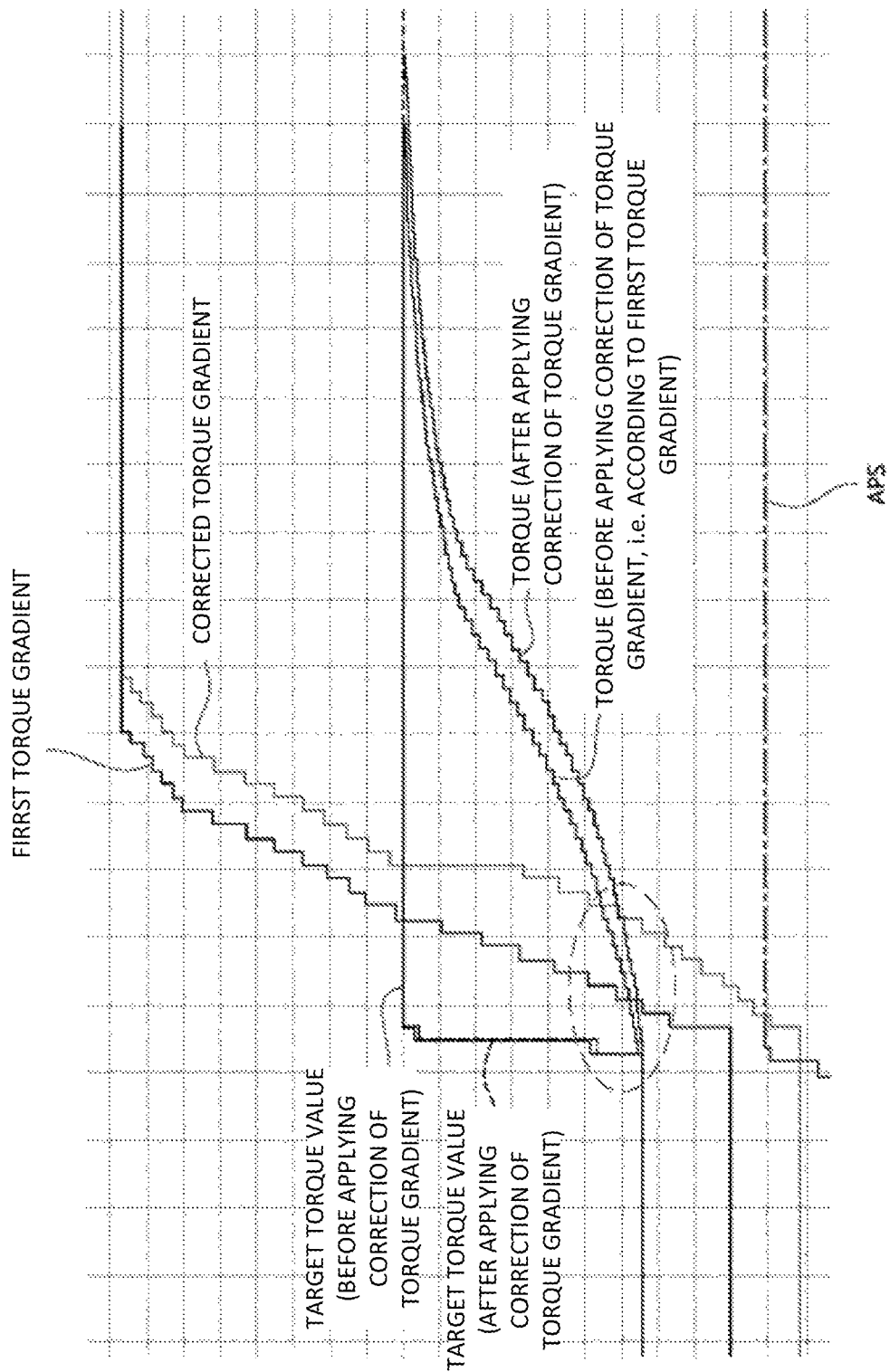
FIG. 8 is a graph showing torque changes when a first torque gradient and a corrected torque gradient are applied in accordance with the present disclosure.

FIG. 6 shows the case in which the first torque gradient is applied even when the current torque of the vehicle is within the low torque range, FIG. 7 shows the case in which the corrected torque gradient is applied when the current torque of the vehicle is within the low torque range and restoration to the first torque gradient is performed when the torque of the vehicle becomes equal to or greater than a predetermined level, and FIG. 8 shows both the graph of FIG. 6 and the graph of FIG. 7 for comparison therebetween. In FIG. 8, the case in which the first torque gradient is applied is indicated by "before improvement", and the case in which the corrected torque gradient is applied is indicated by "after improvement" in order to check the difference.

Figure 2:
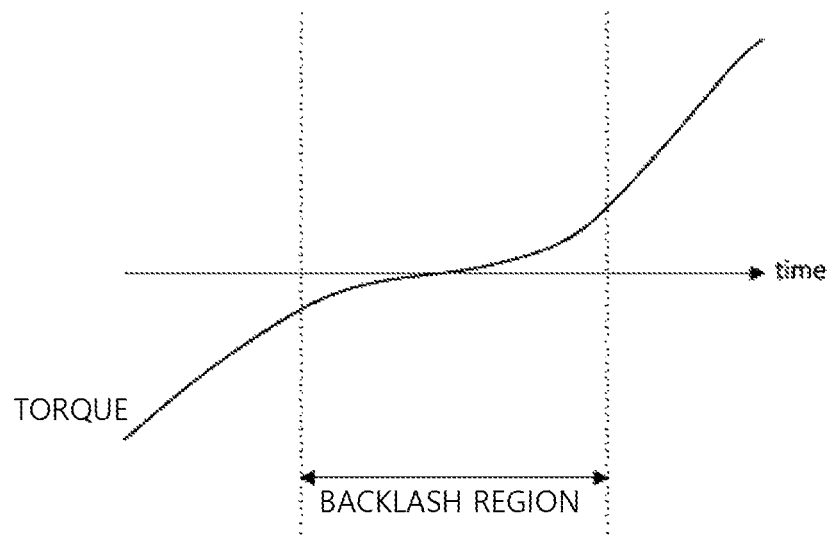
FIG. 2 is a graph showing a first torque gradient applied in a driving situation in which a torque direction is changed.

If the first torque gradient is applied when the current torque of the vehicle is within the low torque range of about 0 Nm, as shown in FIG. 6, the period in which the torque increase rate per hour is small is about half, compared to the graph of FIG. 2 showing the torque gradient when the torque direction is changed.

In contrast, when the corrected torque gradient is applied, as shown in FIG. 7, the period in which the torque increase rate per hour is retained small may be secured for a longer time than when the first torque gradient is applied.

When comparing the degree of increase in torque in an initial period in which the current torque of the vehicle is increased to the target torque, therefore, it can be seen that the torque increase rate per hour is smaller when the corrected torque gradient is applied than when the first torque gradient is applied, as shown in FIG. 8. The torque increase rate per hour may be checked based on the height difference of a stepped graph.

Longer time is necessary for the torque to reach a torque value by reducing the torque increase rate per hour using the corrected torque gradient than for the torque to reach a torque value by reducing the torque increase rate per hour using the first torque gradient. This can be checked from the fact that the torque reaches the same torque value after longer time in the "torque (after improvement)" graph than in the "torque (before improvement)" graph. In FIG. 8, the region in which such difference occurs is indicated by a dotted line.

At this time, it can be seen that, in the "torque gradient (after improvement)", which indicates the corrected torque gradient, torque is abruptly increased and reaches the target torque after the torque of the vehicle reaches a torque value, and then the same shape as the first torque gradient is shown. This means that, when the torque of the vehicle is equal to or greater than a torque value, restoration of the first torque gradient is performed.

Next, a backlash vibration reduction method according to another embodiment of the present disclosure will be described with reference to FIG. 9.

Figure 9:
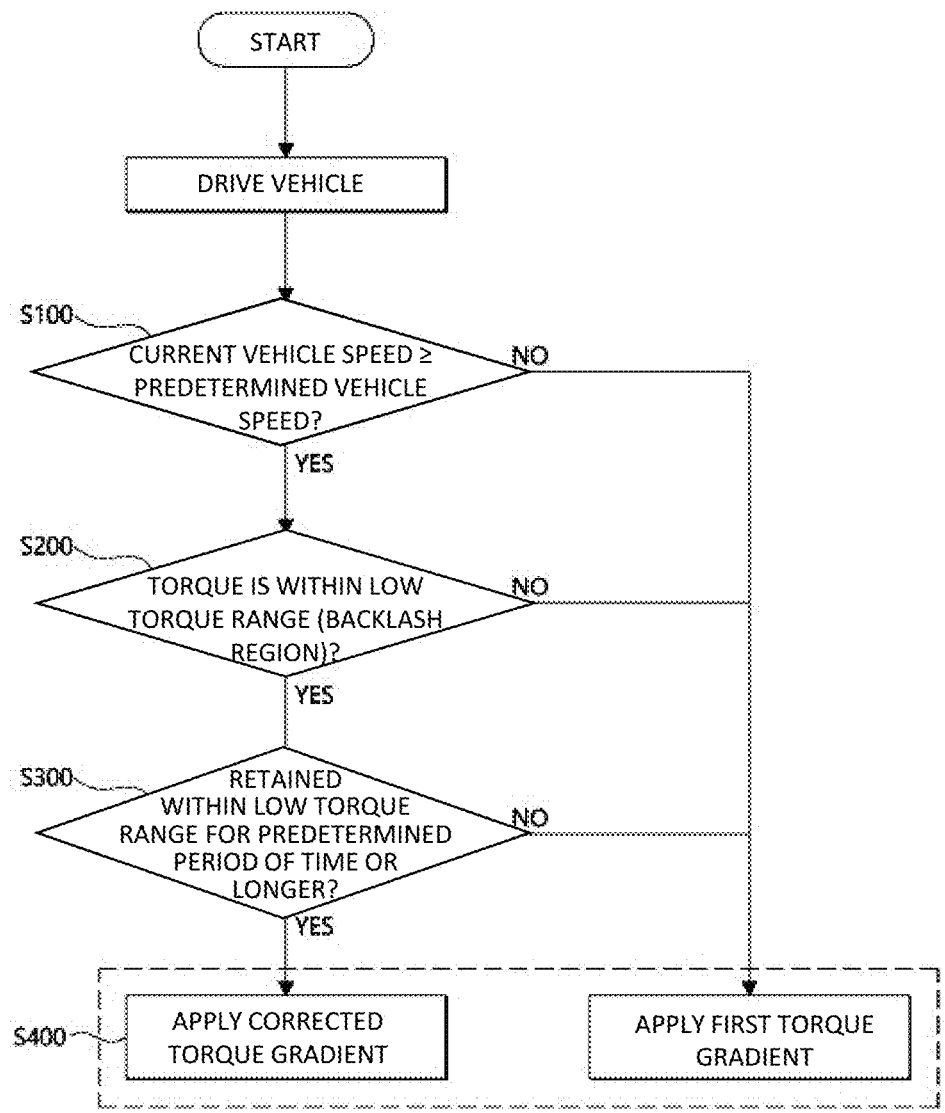
FIG. 9 is a flowchart showing a backlash vibration reduction method according to the present disclosure.

FIG. 9 is a flowchart showing a backlash vibration reduction method according to the present disclosure.

Referring to FIG. 9, the backlash vibration reduction method according to the other embodiment of the present disclosure may include a step (S100, S200, and S300) of determining whether it is necessary to correct a torque gradient to be applied for an increase to target torque in the state in which the current torque of a vehicle is retained within a predetermined low torque range and a step (S400) of determining a corrected torque gradient in which a torque increase rate per hour is reduced and a torque increase time period is extended by multiplying a correction factor by a first torque gradient as a torque gradient that increases the current torque upon determining that it is necessary to correct the torque gradient.

The step of determining whether it is necessary to correct the torque gradient may include a step (S100) of setting a threshold vehicle speed that is not 0 kph in order to determine whether the vehicle is driven and determining whether the current vehicle speed of the vehicle is equal to or greater than the threshold vehicle speed, a step (S200) of setting a low torque range within which the torque of the vehicle that is driven is retained at about 0 Nm and determining whether the current torque of the vehicle is within the low torque range, and a step (S300) of determining whether the current torque of the vehicle is retained within the low torque range for a predetermined time duration or longer in order to exclude the case in which the current torque of the vehicle temporarily falls within the low torque range during torque change.

In the step (S100) of determining whether the current vehicle speed of the vehicle is equal to or greater than the threshold vehicle speed, the current vehicle speed of the vehicle may be estimated using wheel speed acquired from a wheel sensor of the vehicle, and a determination may be made whether the current vehicle speed is equal to or greater than a predetermined threshold vehicle speed.

Also, in the step (S200) of determining whether the current torque of the vehicle is within the low torque range, a determination may be made whether the current torque of the vehicle is within a low torque range set to a predetermined range of about 0 Nm. To this end, in the step (S200) of determining whether the current torque of the vehicle is within the low torque range, a first torque value and a second torque value having small values of about 0 Nm may be specified as boundary values to set the low torque range.

As an example, the low torque range may be set to a value of −5 to 5 Nm. However, the present disclosure is not limited thereto, and the low torque range may be set to a smaller value or a larger value.

Also, in the step (S300) of determining whether the current torque of the vehicle is retained within the low torque range for the predetermined time duration or longer, the time during which the current torque of the vehicle is retained within the low torque range may be measured, and a determination may be made whether the measured time is equal to or longer than a predetermined low torque retention time.

In addition, the current torque of the vehicle may be cyclically acquired, and a determination may be made whether the sum of cycles in which the current torque of the vehicle is retained within the low torque range is equal to or longer than the low torque retention time.

As an example, the low torque retention time is set to 0.1 to 0.5 seconds. However, the present disclosure is not limited thereto, and the low torque retention time may be set to a smaller value or a larger value.

Also, in the step (S400) of determining the corrected torque gradient as the torque gradient, a correction factor may be multiplied by the first torque gradient to create a corrected torque gradient in which a torque increase rate per hour is reduced, the corrected torque gradient may be selected as a torque gradient to be applied until the current torque of the vehicle reaches the target torque, and the same may be output to a motor control unit provided in the vehicle.

To this end, in the step (S400) of determining the corrected torque gradient as the torque gradient, a correction factor of less than 1 may be multiplied by the first torque gradient to create a corrected torque gradient in which a torque increase rate per hour is reduced and a torque increase time period is extended.

The correction factor is set to a value less than 1, since the corrected torque gradient is identical to the first torque gradient if the correction factor is 1. If the correction factor is less than 0.5, a torque increase rate per hour becomes too small. Consequently, the correction factor may be set to a value of 0.5 to 0.9.

The corrected torque gradient thus created may be stored in each torque map together with the first torque gradient, and therefore the torque gradient may be selected and output while being switched according to the result of determination in the step of determining whether it is necessary to correct the torque gradient.

In addition, the backlash vibration reduction method according to the present disclosure may further include a step of changing the torque gradient applied to torque increase from the corrected torque gradient to the first torque gradient when the current torque of the vehicle increased according to the corrected torque gradient deviates from a predetermined torque value.

In the step of changing the torque gradient to the first torque gradient, when the torque of the vehicle that is increased is equal to or greater than the predetermined torque value, a determination may be made that sufficient time for gear alignment has elapsed, and the torque gradient may be changed to the first torque gradient, thereby improving vehicle responsiveness.

Also, in the step of changing the torque gradient to the first torque gradient, even when a brake manipulation signal (BPS) is input during torque increase according to the corrected torque gradient, the torque gradient applied to torque change of the vehicle may be changed from the corrected torque gradient to the first torque gradient.

In the present disclosure, as described above, when the current torque of the vehicle is increased while being retained at a small value of about 0 Nm, a corrected torque gradient in which a torque increase rate per hour is reduced and a period necessary for the current torque of the vehicle to be increased to a torque value is increased may be created, instead of a first torque gradient set to reduce backlash vibration when gears are switched in a forward direction from the state in which the gears are in tight contact with each other in a reverse direction, whereby the corrected torque gradient may be temporarily applied to torque increase within the low torque range of about 0 Nm to which the current torque of the vehicle belongs.

Even in the low torque retention situation in which gear alignment is not performed when the first torque gradient is applied without change, therefore, gear alignment may be sufficiently performed, whereby it is possible to prevent roughness due to backlash vibration during driving of the vehicle.

Meanwhile, the present disclosure may be implemented as a computer-readable program stored in a computer-readable recording medium. The computer-readable medium may be any type of recording device in which data is stored in a computer-readable manner. The computer-readable medium may include, for example, a hard disk drive (HDD), a solid state disk (SSD), a silicon disk drive (SDD), a read-only memory (ROM), a random access memory (RAM), a compact disc read-only memory (CD-ROM), a magnetic tape, a floppy disk, and an optical data storage device.

As is apparent from the above description, in various embodiments of the present disclosure described above, when the current torque of a vehicle is increased while being retained at a small value of about 0 Nm, torque increase is temporarily performed by a corrected torque gradient in which a torque increase rate per hour is reduced and a torque increase time period to a torque value is increased, instead of a first torque gradient. Even when acceleration is performed in a low torque retention situation, therefore, gear alignment may be sufficiently performed, whereby it is possible to prevent roughness due to backlash vibration during driving of the vehicle.

Effects obtainable from the present disclosure are not limited by the above mentioned effects, and other unmentioned effects can be clearly understood from the above description by those having ordinary skill in the technical field to which the present disclosure pertains.

The above detailed description is not to be construed as limiting the present disclosure in any aspect, but is to be considered by way of example. The scope of the present disclosure should be determined by reasonable interpretation of the accompanying claims, and all equivalent modifications made without departing from the scope of the present disclosure should be understood as being included in the following claims.

What is claimed is:

1. A motor control unit for use in a vehicle, comprising:
a correction determination unit configured to determine whether correction of a torque gradient, to be applied for increasing a current torque of a vehicle to a target torque, is required in a state in which the current torque of the vehicle is within a predetermined low torque range; and
a torque gradient correction unit configured to determine a corrected torque gradient to increase the current torque to the target torque by multiplying a first torque gradient by a correction factor,
wherein a torque increase rate per time period is further reduced, with respect to the first torque gradient, and
wherein a torque increase time period is further extended, with respect to the first torque gradient, by applying the corrected torque gradient.

2. The motor control unit according to claim 1, wherein the correction determination unit comprises:
a low torque determination unit configured to determine whether the current torque is within a low torque range;
a vehicle speed comparison unit configured to determine whether a current vehicle speed of the vehicle is equal to or greater than a threshold vehicle speed; and
a retention time determination unit configured to determine whether a time duration during which the current torque is retained within the low torque range is equal to or greater than a predetermined value.

3. The motor control unit according to claim 2, wherein the low torque determination unit is further configured to determine that the current torque is retained within the low torque range when the current torque is a value within a range of −5 Nm to 5 Nm.

4. The motor control unit according to claim 2, wherein the retention time determination unit is further configured to determine that a condition, in which correction of the torque gradient is required, is satisfied when the time duration, during which the current torque is retained, is within the low torque range of 0.1 seconds to 0.5 seconds.

5. The motor control unit according to claim 1, wherein the correction factor is less than 1.

6. The motor control unit according to claim 5, wherein the correction factor is a value ranging from 0.5 to 0.9.

7. The motor control unit according to claim 1, further comprising:
a torque gradient restoration unit configured to change a torque gradient applied to increase the current torque from the corrected torque gradient to the first torque gradient when a torque of the vehicle is equal to or greater than a predetermined torque value.

8. The motor control unit according to claim 7, wherein, when a brake manipulation signal is input, the torque gradient restoration unit is further configured to change the torque gradient from the corrected torque gradient to the first torque gradient.

9. A vehicle comprising the motor control unit of claim 1.

10. A method for controlling a motor in a vehicle, the method comprising:
determining whether correction of a torque gradient, to be applied for increasing a current torque of a vehicle to a target torque, is required in a state in which the current torque of the vehicle is within a predetermined low torque range; and
determining a corrected torque gradient to increase the current torque to the target torque by multiplying a first torque gradient by a correction factor, such that a torque increase rate per time period is further reduced, with respect to the first torque gradient, and a torque increase time period is further extended, with respect to the first torque gradient, by applying the corrected torque gradient.

11. The method according to claim 10, wherein the determining of whether correction of the torque gradient step further includes:
determining whether the current torque is within the low torque range;
determining whether a current vehicle speed of the vehicle is equal to or greater than a threshold vehicle speed; and
determining whether the current torque is retained within the low torque range over a predetermined time duration.

12. The method according to claim 11, wherein, in the determining of whether the current torque is within the low torque range, the current torque is determined to be within the low torque range when the current torque is a value of −5 to 5 Nm.

13. The method according to claim 11, wherein the determining of whether the current torque is within the low torque range over the predetermined time duration step further includes determining that a condition, in which correction of the torque gradient is required, is satisfied when a time duration, during which the current torque is retained, is within the low torque range of 0.1 seconds to 0.5 seconds.

14. The method according to claim 10, wherein the correction factor is less than 1.

15. The method according to claim 14, wherein the correction factor is a value ranging from 0.5 to 0.9.

16. The method according to claim 10, further comprising:
    changing a torque gradient applied to increase the current torque from the corrected torque gradient to the first torque gradient when a torque of the vehicle is equal to or greater than a predetermined torque value.

17. The method according to claim 16, wherein, in the changing of the torque gradient step, and when a brake manipulation signal is input, the torque gradient is changed from the corrected torque gradient to the first torque gradient.

18. A non-transitory computer-readable recording medium having a software program stored thereon containing computer executable code that when executed is configured to perform the method according to claim 10.

* * * * *